US011567943B1

(12) United States Patent
Blum et al.

(10) Patent No.: US 11,567,943 B1
(45) Date of Patent: *Jan. 31, 2023

(54) RESTRICTED QUERIES IN A DATABASE CLEAN ROOM

(71) Applicant: Snowflake Inc., Bozeman, MT (US)

(72) Inventors: Rachel Frances Blum, South Orange, NJ (US); Justin Langseth, Kailua, HI (US); Michael Earle Rainey, Pasco, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,873

(22) Filed: Feb. 28, 2022

Related U.S. Application Data

(63) Continuation-in-part of application No. 17/538,785, filed on Nov. 30, 2021.

(60) Provisional application No. 63/266,253, filed on Dec. 30, 2021.

(51) Int. Cl.
*G06F 16/2455* (2019.01)
*G06F 16/242* (2019.01)
*G06F 16/27* (2019.01)

(52) U.S. Cl.
CPC .... *G06F 16/24565* (2019.01); *G06F 16/2443* (2019.01); *G06F 16/27* (2019.01)

(58) Field of Classification Search
CPC .......... G06F 16/24565; G06F 16/2443; G06F 16/27
USPC ....................................................... 707/779
See application file for complete search history.

(56) References Cited

U.S. PATENT DOCUMENTS

| 9,104,762 | B1 | 8/2015 | Ward |
| 9,825,963 | B2 | 11/2017 | Kurian et al. |
| 10,628,415 | B1 * | 4/2020 | Rajaperumal ....... G06F 16/2393 |
| 2010/0274785 | A1 | 10/2010 | Procopiuc et al. |

OTHER PUBLICATIONS

U.S. Appl. No. 17/538,785, filed Nov. 30, 2021, Dynamic Data Restriction in a Database Clean Room.
"U.S. Appl. No. 17/538,785, Non-Final Office Action dated Mar. 31, 2022", 12 pgs.
"U.S. Appl. No. 17/538,785, Final Office Action dated Aug. 26, 2022", 23 pgs.
"U.S. Appl. No. 17/538,785, Response filed Jun. 30, 2022 to Non Final Office Action dated Mar. 31, 2022", 10 pgs.

* cited by examiner

*Primary Examiner* — Michael Pham
(74) *Attorney, Agent, or Firm* — Schwegman Lundberg & Woessner, P.A.

(57) ABSTRACT

Embodiments of the present disclosure may provide a data clean room architecture that restricts data included in the clean room. The data clean room architecture can implement a policy to enable data restrictions for data shared between multiple parties via a distributed database. Multiple database accounts can implement validation instances to validate queries when received from other database accounts. One or more of the database accounts can provide a query template that is congruent with the validation instance for use by the other database accounts to generate queries against the data shared in the data clean room.

30 Claims, 14 Drawing Sheets

PARTY_1 SOURCE DATA 500

| CUST_ID | EMAIL |
|---|---|
| 1 | XYZ@123.NET |
| 2 | ABC@123.NET |

PARTY_2 SOURCE DTA 550

| CUST_ID | EMAIL |
|---|---|
| 100 | GEF@456.NET |
| 200 | ABC@123.NET |

*FIG. 5*

RESTRICTED QUERIES IN A DATABASE CLEAN ROOM

CROSS-REFERENCE TO RELATED APPLICATIONS

This application claims the benefit of priority to U.S. Provisional Patent Application Ser. No. 63/266,253, filed Dec. 30, 2021; and is also a Continuation-in-Part of U.S. patent application Ser. No. 17/538,785, filed Nov. 30, 2021, the contents of which are incorporated herein by reference.

TECHNICAL FIELD

The present disclosure generally relates to securely providing data in a data clean room of a distributed database.

BACKGROUND

Currently, most digital advertising is performed using third-party cookies. Cookies are small pieces of data generated and sent from a web server and stored on the user's computer by the user's web browser that are used to gather data about customers' habits based on their website browsing history. Because of privacy concerns, the use of cookies is being restricted. Companies may want to create target groups for advertising or marketing efforts for specific audience segments. To do so, companies may want to compare their customer information with that of other companies to see if their customer lists overlap for the creation of such target groups. Thus, companies may want to perform data analysis, such as an overlap analysis, of their customers or other data.

BRIEF DESCRIPTION OF THE DRAWINGS

Various ones of the appended drawings merely illustrate example embodiments of the present disclosure and should not be considered as limiting its scope.

FIG. 5 shows example sets of source data from different database accounts of a distributed database, according to some example embodiments.

DETAILED DESCRIPTION

Figure 1:
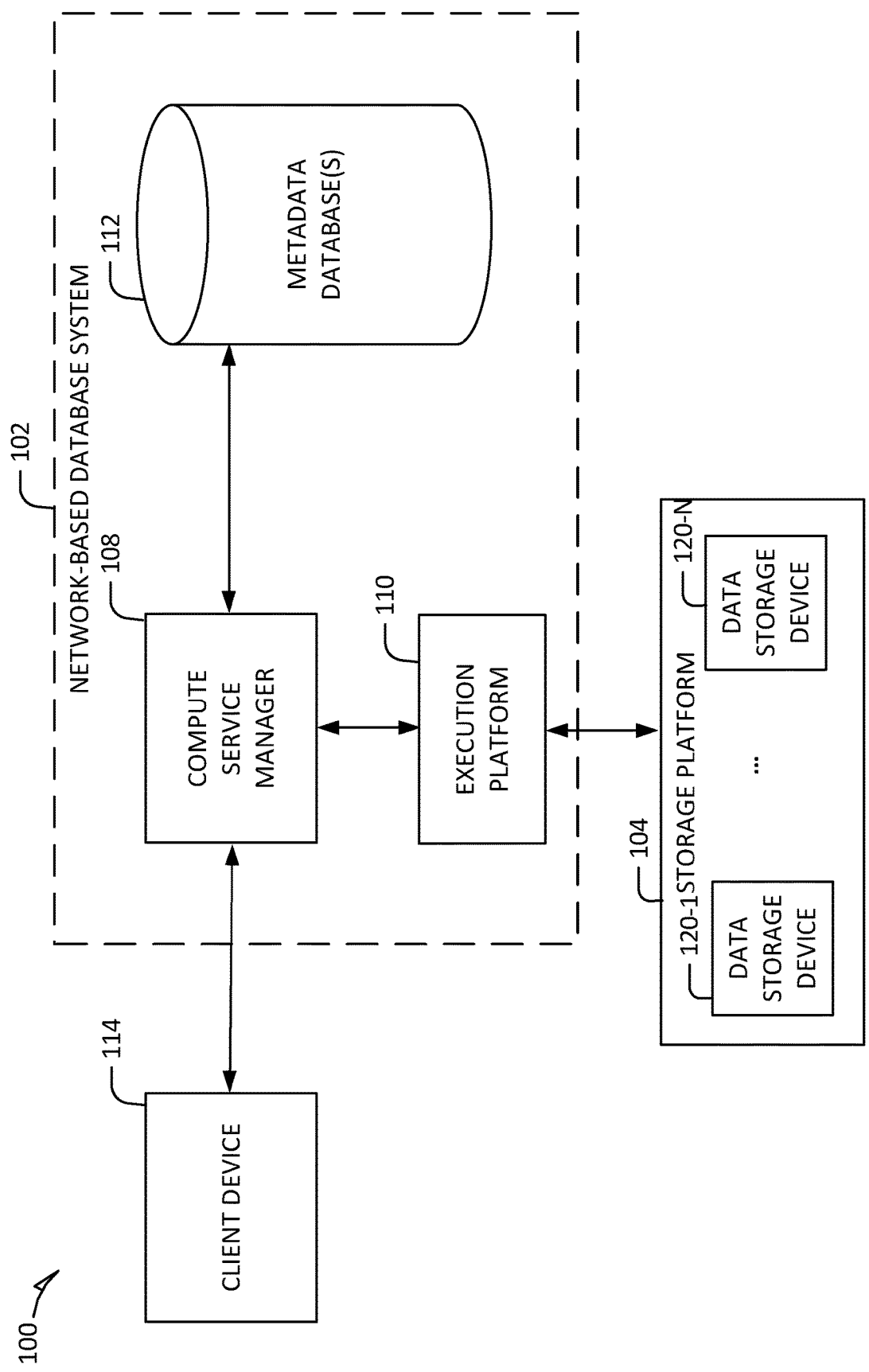
FIG. 1 illustrates an example computing environment in which a network-based database system can data clean rooms, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, it can be difficult to share data securely and efficiently between data stores of different entities. To this end, a dynamic restriction data clean room system can be implemented to restrict data that is provided through a data clean room based on a database statement (e.g., query) being in an approved statements table, in accordance with some example embodiments. In some example embodiments, a first database account (e.g., a provider database account) and a second database account (e.g., a consumer database account) generate an approved statements table that stores database statement language that can be executed against source data provided by the first database account and other source data provided by the second database account. In some example embodiments, the approved query or database statements may or may not be pre-agreed upon by the different parties, and instead a single provider or publisher of data specifies what portions of his data can be accessed via a query executing by a requestor (e.g., via an available values table) and the queries are validated by shared code (e.g., shared stored procedure). In some example embodiments, a query template is provided by the provider or publisher database that can be modified by a requestor to generate query requests that are congruent with the validation procedures set by the provider.

The clean room system can include a restriction engine that functions as a database firewall on the source data from the respective database accounts. In this way, only the data to be included in the clean room is shared with the other parties, and the data need not be obfuscated (e.g., salted, encrypted) for direct matching—based clean room query processing. In some example embodiments, the restriction engine implements row access policy (RAP) based restrictions to the source data in response to a clean room query being received and validated via stored procedure. In some example embodiments, the restriction engine implements dynamic data masking—(DMM) based restrictions to the source data in response to a clean room query being received against the data shared in the clean room. The respective source datasets from the first and second database accounts are shared with each other through a distributed database system. After being shared, a query on the shared source datasets can be issued. For example, the first database account generates a SELECT statement with a JOIN on the first source data from the first database account and the second source data from the second database account, where the data is joined based on matching emails of end users (e.g., as user IDs for the respective users). In response, the dynamic restricted data clean room system determines whether the received query is in the approve query requests table. In some example embodiments, if the received query is in the approve query requests table, and the if restriction engine enables access to the data specified in the query, then the query is executed on the first data and the source data, as restricted by the restriction engine. In this way, the dynamic restriction engine can implement a data clean room to secure source datasets in a computationally efficient approach that does not share entire datasets. Further, the dynamic restriction engine enables more than two parties to share database source data in the clean room, such as a query that specific a JOIN on a first source dataset from a first database account, second source dataset from a second database account, and a third source dataset from a third database account.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata databases 112 may include a summary of data stored in remote data storage systems as well as data available from a local cache. Additionally, a metadata databases 112 may include information regarding how data is organized in remote data storage systems (e.g., the cloud storage platform 104) and the local caches. Information stored by a metadata databases 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata databases 112, execution platform 110, and cloud storage platform 104 are shown in FIG. 1 as individual discrete components. However, each of the compute service manager 108, metadata databases 112, execution platform 110, and cloud storage platform 104 may be implemented as a distributed system (e.g., distributed across multiple systems/platforms at multiple geographic locations). Additionally, each of the compute service manager 108, metadata databases 112, execution platform 110, and cloud storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
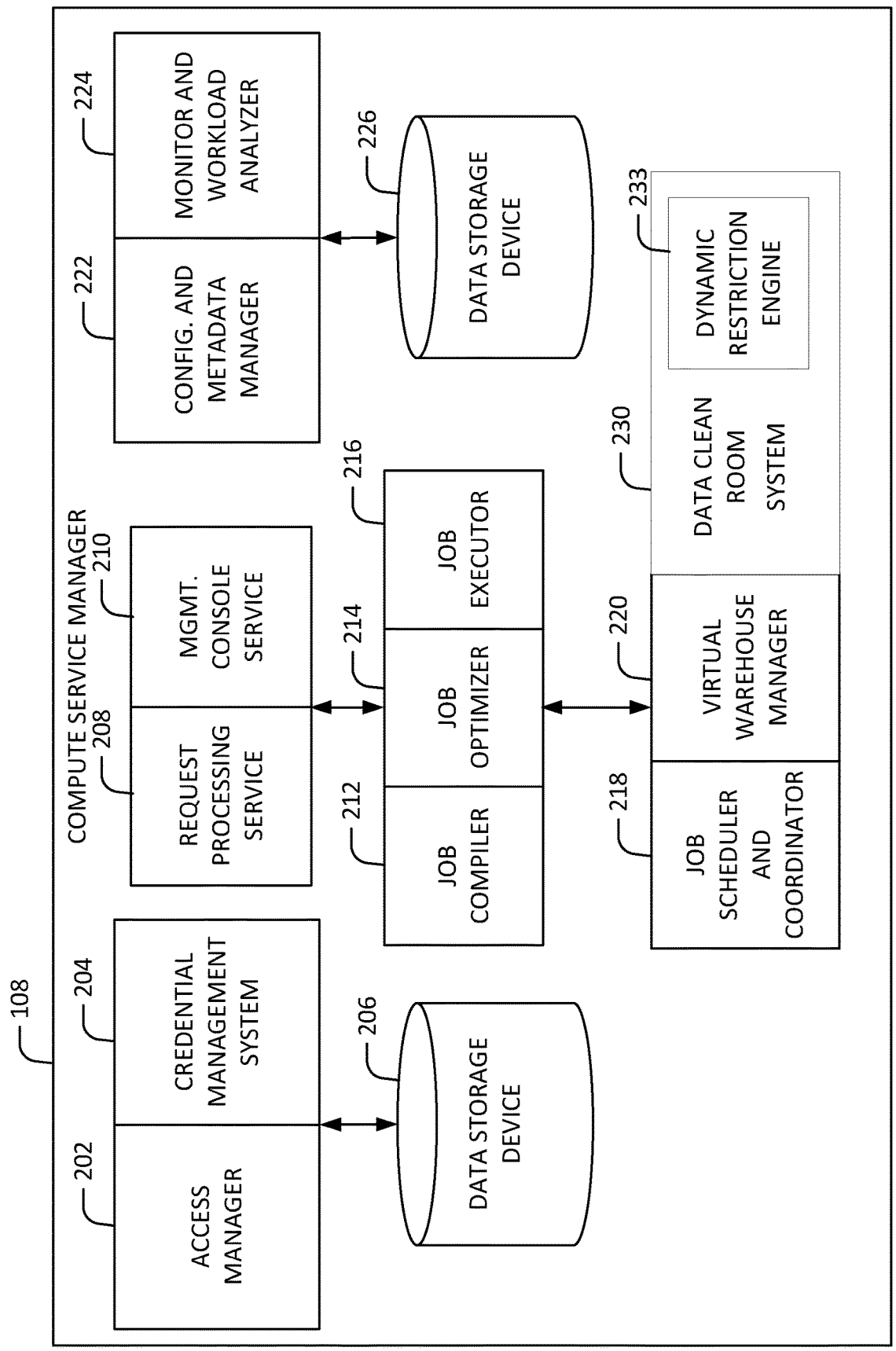
FIG. 2 is a block diagram illustrating components of a compute service manager, according to some example embodiments.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to access metadata database in the data storage device 206, which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., the access metadata database of the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database of the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. A data clean room system 230 is configured to share data between two or more parties (e.g., different database accounts of different organizations or users) in a dynamically restricted data clean room. The dynamic restriction engine 233 is configured to implement different types of restrictions on the shared data in the dynamically restricted data clean room, such as row access policies or dynamic data masking, as discussed in further detail below.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
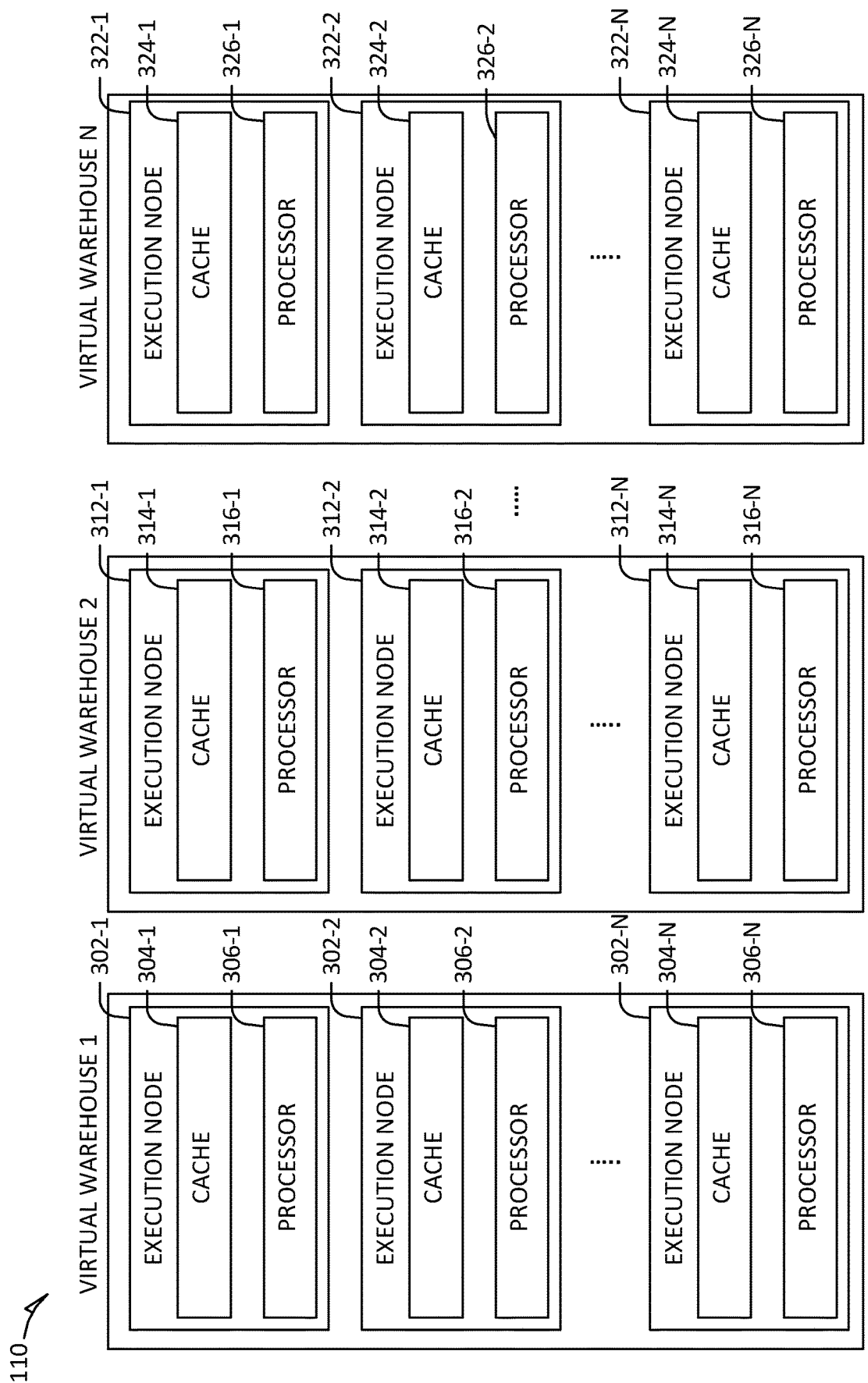
FIG. 3 is a block diagram illustrating components of an execution platform, according to some example embodiments.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
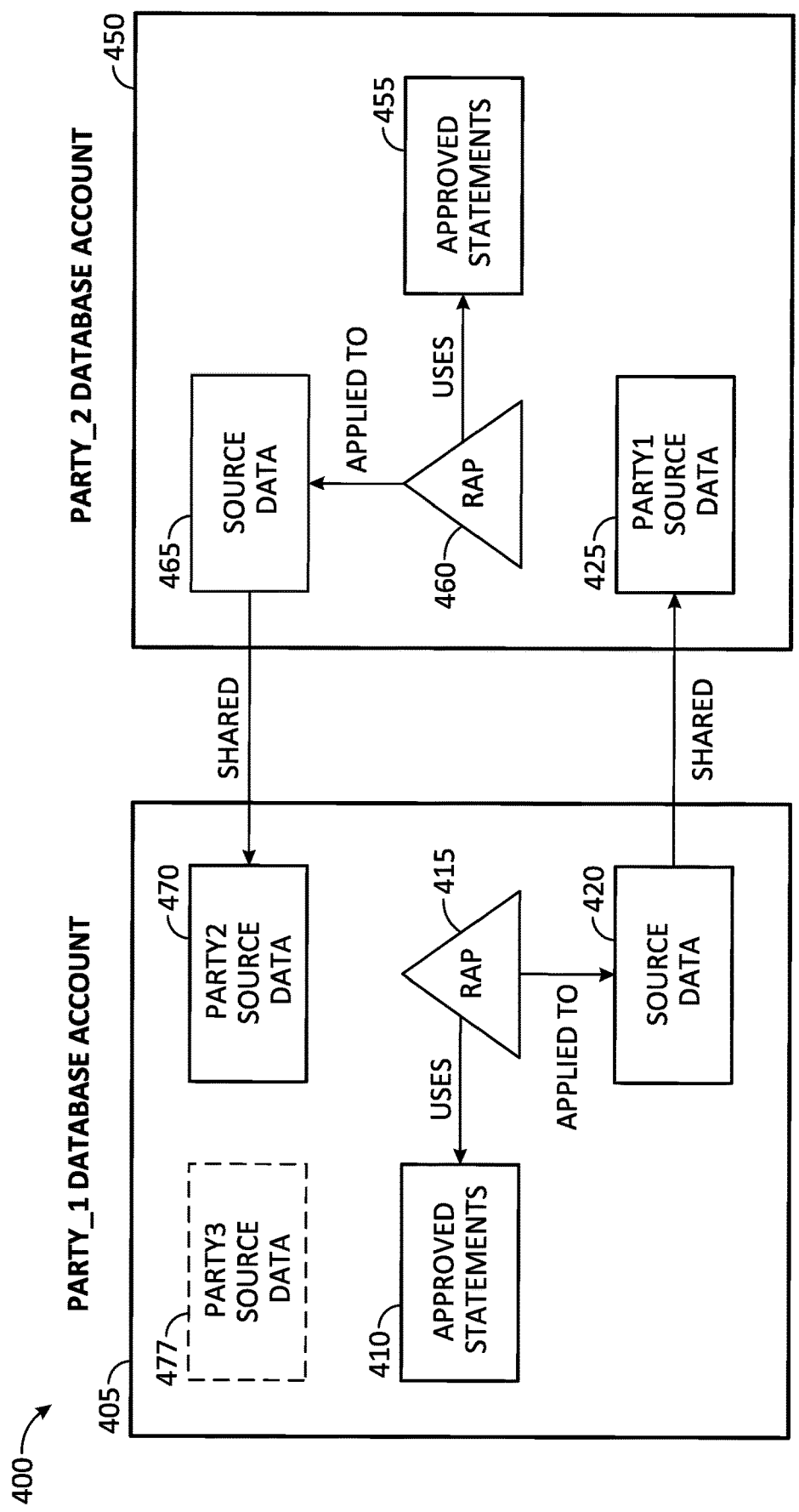
FIG. 4 shows an example dynamic data restriction clean room architecture using row access policy configuration, according to some example embodiments.

FIG. 4 shows a dynamically restricted data clean room architecture 400, according to some example embodiments. In FIG. 4, a first database account 405 and a second database account 450 share data in a data clean room architecture 400 against which queries can be issued by either account. In the following example, the first database account 405 provides data to the second database account 450 (e.g., using approved statements table 410, row access policy engine 415, source data 420, and shared source data 425), and it is appreciated that the second database account 450 can similarly share data with the first database account 405 (e.g., using approved statements table 455, row access policy engine 460, source data 465, and shared source data 470).

In the example of FIG. 4, the dynamic restriction engine 233 implements a row access policy scheme (e.g., row access policy engine 415, row access policy engine 460) on the source datasets of the first and second database accounts (e.g., source data 420, source data 465). In some example embodiments, the row access policy engine is implemented as a database object of the network-based database system 102 that restricts source data of a database account for use sharing in the clean room.

In some example embodiments, a database object in the network-based database system 102 is a data structure used to store and/or reference data. In some example embodiments, the network-based database system 102 implements one or more of the following objects: a database table, a view, a stored procedure of the database system, a user-defined function of the database system, or a sequence. In some example embodiments, when the network-based database system 102 creates a database object type, the object is locked, and a new object type cannot be created due to the network-based database system 102 restricting the object types using source code of the database system. In some example embodiments, when objects are created, a database object instance is what is created by the database system 102 as an instance of a database object type (e.g., such as a new table, a view on the same table, or a new stored procedure object).

The row access policy engine provides row-level security to data of the network-based database system 102 through the use of row access policies to determine which rows to return in the query result. Examples of a row access policy include: allowing one particular role to view rows of a table (e.g., user role of an end user issuing the query), or including a mapping table in the policy definition to determine access to rows in a given query result. In some example embodiments, a row access policy is a schema-level object of the network-based database system 102 that determines whether a given row in a table or view can be viewed from different types of database statements including SELECT statements or rows selected by UPDATE, DELETE, and MERGE statements.

In some example embodiments, the row access policies include conditions and functions to transform data at query runtime when those conditions are met. The policy data is implemented to limit sensitive data exposure. The policy data can further limit an object's owner (e.g., the role with the OWNERSHIP privilege on the object, such as a table or view) who normally has full access to the underlying data. In some example embodiments, a single row access policy engine is set on different tables and views to be implemented at the same time. In some example embodiments, a row access policy can be added to a table or view either when the object is created or after the object is created.

In some example embodiments, a row access policy comprises an expression that can specify database objects (e.g., table or view), and use Conditional Expression Functions and Context Functions to determine which rows should be visible in a given context. The following is an example of a Row Access Policy being implemented at query runtime: (A) for data specified in a query, the network-based database system 102 determines whether a row access policy is set on a database object. If a policy is added to the database object, all rows are protected by the policy. (B) The distributed database system then creates a dynamic secure view (e.g., a secure database view) of the database object. (C) The policy expression is evaluated. For example, the policy expression can specify a "current statement" expression that only proceeds if the "current statement" is in the approved statements table, or if the current role of the user that issued the query is a previously specified and allowed role. (D) Based on the evaluation of the policy, the restriction engine generates the query output, such as source data to be shared from a first database account to a second database account, where the query output only contains rows based on the policy definition evaluating to TRUE.

Continuing with reference to FIG. 4, the contents of the approved statements table is agreed upon or otherwise generated by the first database account 405 and second database account 450. For example, the users managing the first database account 405 and second database account 450 agree upon query language that is acceptable to both and include the query language in the approved statements table, and the agreed upon language is stored in the approved statements table 410 on the first database account 405 and also stored in the approved statements table 455 in the second database account 450. As an illustrative example, the source data 420 of the first database account 405 can include a first email dataset 500 of the first database account's users, and the source data 465 of the second database account 450 can include a second email dataset 550 of the second database accounts users, as illustrated in FIG. 5. The two database accounts may seek to determine how many of their user email addresses in their respective datasets match, where the returned result is a number (e.g., each has end users and the two database accounts are interested in how many users they share, but do not want to share the actual users' data). To this end, the two database accounts store "SELECT COUNT" in the approve query requests table. In this way, a counting query that selects and joins the source data can proceed, but a "SELECT *" query that requests and potentially returns all user data cannot proceed as it is not in the approved statements tables of the respective dataset accounts (e.g., the approved statements table 410 and the approved statements table 455).

Further, although only two database accounts are illustrated in FIG. 4, the data clean room system 230 enables two or more database accounts to share data through the clean room architecture. In past approaches, data clean room data is obfuscated and then shared in a data clean room, and the complexity of matching obfuscated data can result in limiting the data clean room data to only two parties at a time. In contrast, in the approach of FIG. 4, a third database account (not illustrated in FIG. 4) can provide a third-party shared dataset 477 using the data clean room system 230, and database statements can be issued that join data from the three datasets, such as a SELECT COUNT on a joined data from the source data 420, the shared source data 470 from the second database account 450, and the third-party shared dataset 477 from the third database account (e.g., as opposed to a requester database account sharing data with a first provider database account, and the requester database account further correlating the data with another second provider database account using sequences of encrypted functions provided by the first and second provider accounts), in accordance with some example embodiments.

Figure 6:
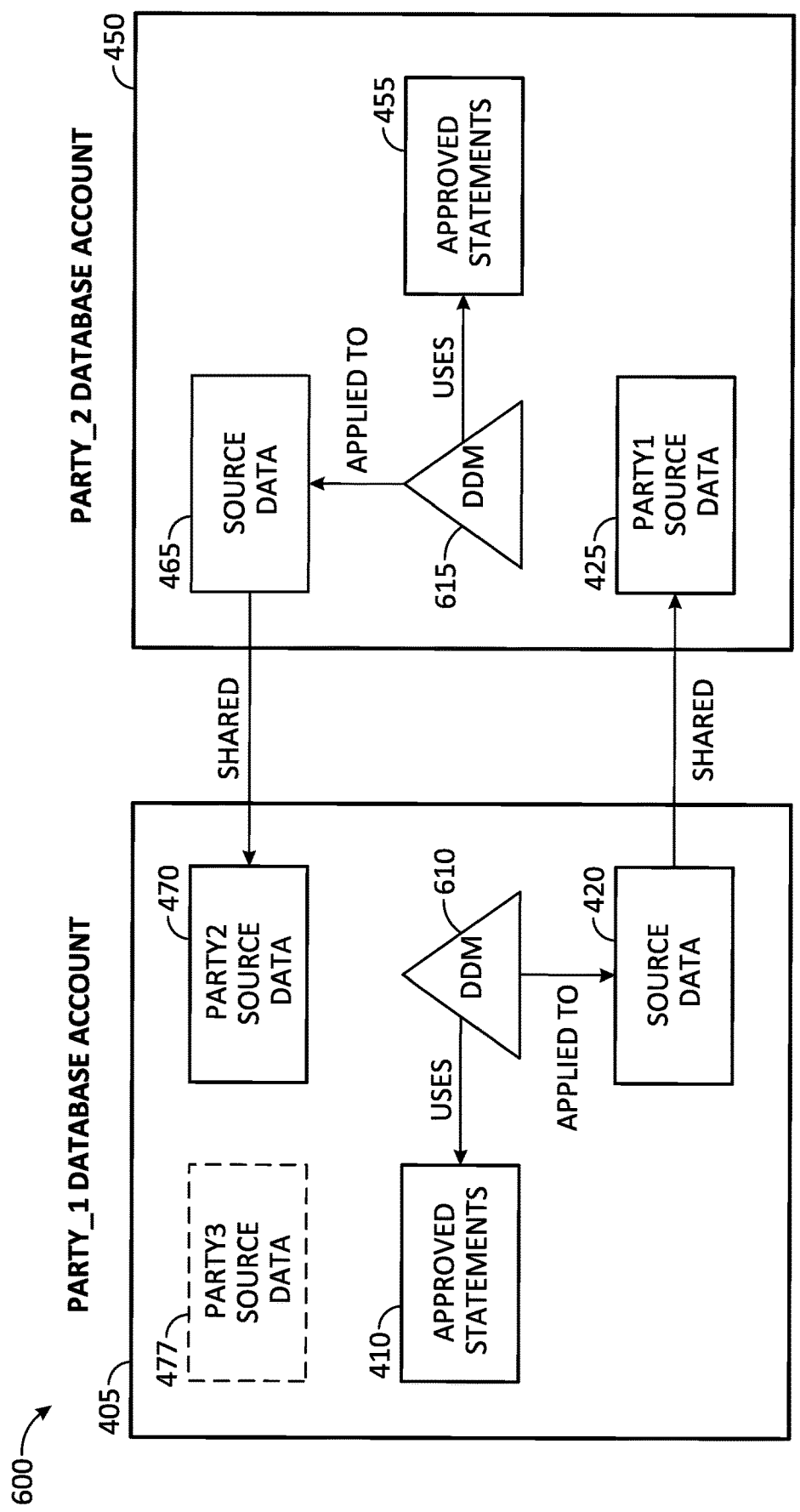
FIG. 6 shows an example dynamic data restriction clean room architecture using dynamic data masking, according to some example embodiments.

FIG. 6 shows a data clean room architecture 600, according to some example embodiments. In contrast to FIG. 4, the dynamic restriction engine 233 of the data clean room system 230 implements a dynamic data masking scheme (e.g., DDM 610, DDM 615) on the source datasets from the different database accounts (e.g., source data 420, source data 465). Dynamic Data Masking provides column-level security in which a masking policy selectively masks data at query time that was previously loaded in plain text into the distributed database (e.g., stored in the data storage devices 120-1 to 120-N).

In some example embodiments, the dynamic restriction engine 233 implements a dynamic data masking policy as a schema-level object, in which a database and schema are to exist before a masking policy can be applied to a given column. In some example embodiments, at query runtime, the dynamic data masking policy is applied to the column at every location where the column appears (e.g., in any of the source datasets, which are then shared for queries to join and return results). In some example embodiments, dynamic data masking can implement role-based limiting of columns, and the source data may be visible through the restriction engine in plain-text value format (e.g., full email address: abcdefg@mailservice.com), a partially masked value (e.g., abc ####@mailservice.com), or a fully masked value (e.g., #######). In some example embodiments, the dynamic restriction engine 233 implements a row access policy engine to restrict data at the row level and further implements dynamic data masking to restrict the clean room data at the column level.

Figure 7:
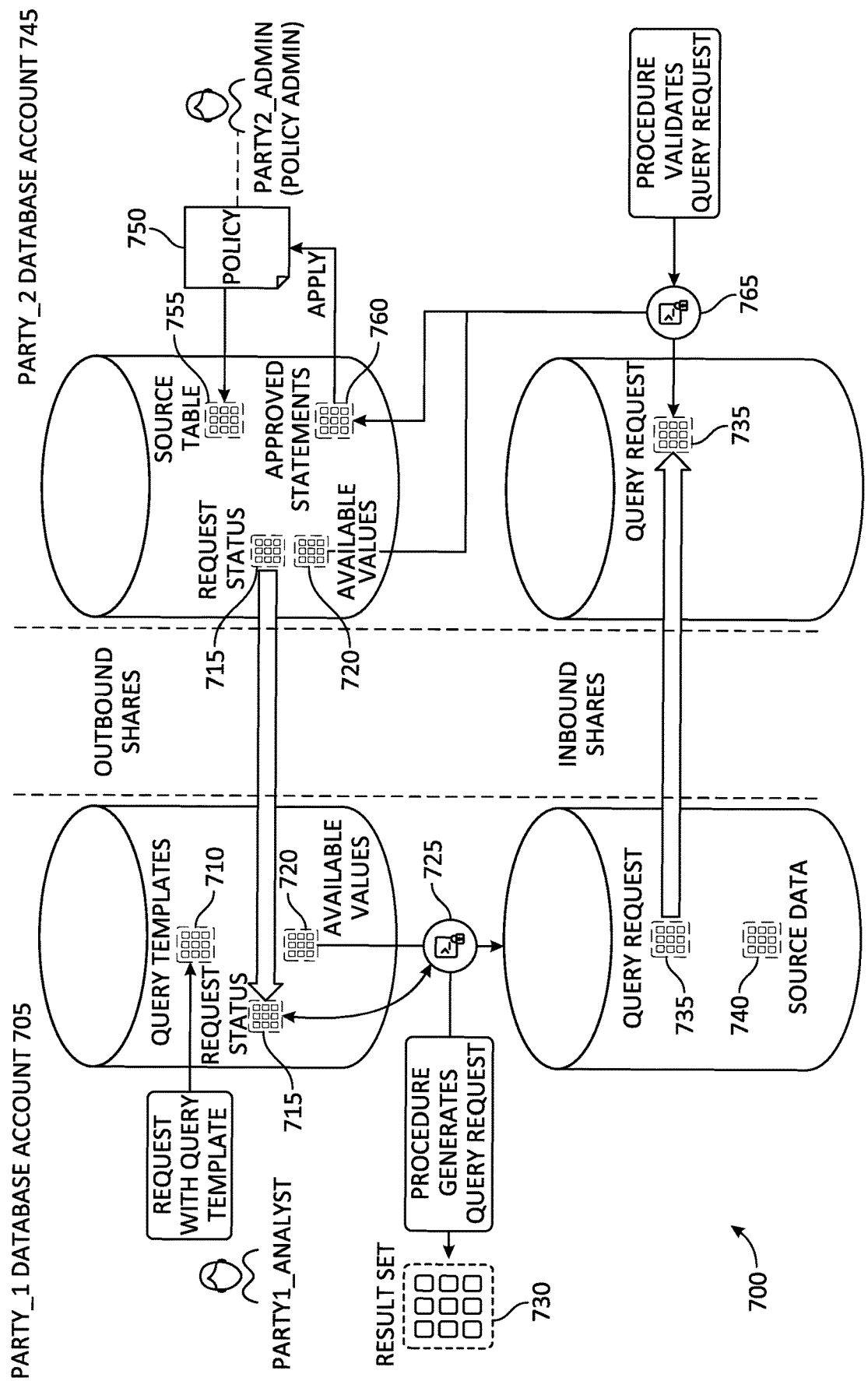
FIG. 7 shows a share architecture, according to some example embodiments.

FIG. 7 shows a data clean room share architecture 700, in accordance with some example embodiments. In the example of FIG. 7, a single publisher, party_2 database 745, is providing access to their published data, source data 755, with a requesting party, party_1 database 705 (e.g., consumer database account, requestor database account), to perform a query, such as overlap analysis to determine which customer end users the two entities have in common without exposing the full data sets to each other. Although FIG. 7 shows two entities sharing data, the same approach can be implemented to share data between more than two entities, as discussed in further detail below with reference to FIG. 8A-8C.

In the example of FIG. 7, party_2 database 745 configures the dynamic restriction engine 233 to implement a policy 750 (e.g., RAP, DDM) on the source data, according to the approved statements table 760. In some example embodiments, the policy 750 functions as an "always on" firewall, in which new queries are added to the approved statements table 760, such that the policy 750 functions as a firewall that whitelists queries that can be executed (e.g., via share processes). In some example embodiments, the party_2 database 745 configures a stored procedure 765 which runs on execution nodes of the party_2 database 745 to perform validation (e.g., column validation, value validation, wildcard ("*") validation), etc.) of requests received from party_1 database 705, or other additional parties (e.g., third parties, as in FIGS. 8A-8C).

In some example embodiments, a stored procedure on the distributed database is a subroutine available to databases (e.g., database accounts of the distributed database) that can be created once and can be executed many times using execution nodes of the database (e.g., a first set of execution nodes that are managed by the party_1 database 705). In some example embodiments, the stored procedure can be generated in a scripting language, such as JavaScript, and stored using the CREATE PROCEDURE command on the distributed database. The stored procedure can be executed with a CALL command from the given database and then executed using the execution nodes of the database (e.g., a first set of execution nodes that are managed by the party_1 database 705). In some example embodiments, the stored procedures of FIG. 7 are supplemented by user-defined functions (UDFs), which are user-defined functions generated by the administrative users that manage a given database. The UDFs enable the admin users of the database account (e.g., publisher or provider database account) to extend the functionality of the distributed database system to perform operations that are not available through the built-in, system-defined functions that are native to the network-based database system 102. In some example embodiments, one difference between implementing stored procedures or UDFs by the party_1 database 705 and party_2 database 745 is that UDFs can be used like any other expression within SQL statements on the network-based database system 102, whereas stored procedures must be invoked using a CALL statement.

Figure 10:
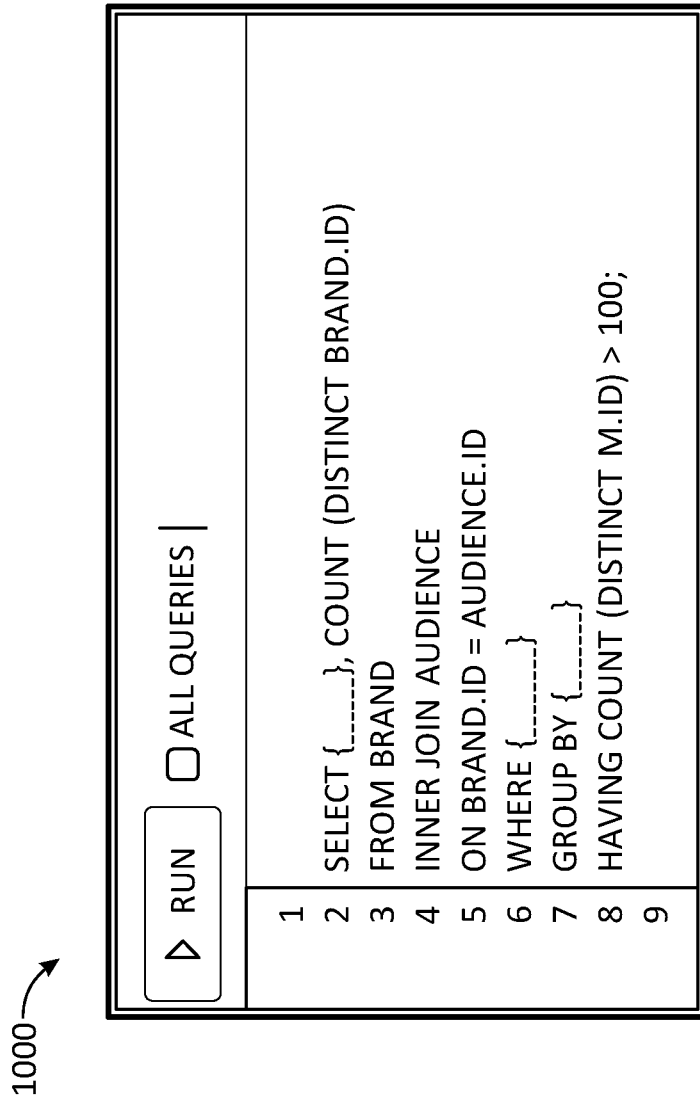
FIG. 10 shows an example query template for the database clean room, according to some example embodiments.

Continuing, in some example embodiments, the party_2 database 745 configures the stored procedure 765; any query request that does not conform with the rules configured in the stored procedure 765 is rejected and never added to the approved statements table 760 for application by the policy 750 to the source data 755. In some example embodiments, to assist the requestors, e.g., party_1 database 705, in formulating query requests that will not be rejected and properly pass the validation of the stored procedure 765, the party_2 database 745 shares a query template 710 with potential requestors of data, such as party_1 database 705. FIG. 10 shows an example of a query template 1000. As illustrated in FIG. 10, the query template 1000 can specify which query statements are valid and will not be rejected (e.g., SELECT can be permitted via stored procedure 765, whereas INSERT will be rejected by stored procedure 765). Additionally, values can be open to be filled out by the requestor, or hard-set to a certain range of values (e.g., the requestor may change the values in the query template 1000 but the changed values will still be rejected by the stored procedure 765).

In some example embodiments, the party_1 database 705 receives the query template 710 and fills out fields or completes database statements to customize the query according to the goals of party_1 database 705 (e.g., to perform overlap analysis on the source data 740 of party_1 database 705 and the source data 755 of party_2 database 745). Upon completing and submitting a query using the query template 710 (or submitting a free-form query not using a template), a stored procedure 725 executes on execution nodes of the party_1 database 705. The stored procedure 725 inserts the query request into a query request table 735, which is a shared table that is shared with the party_1 database 705. To generate the query request into the query request table 735, the stored procedure JOINs source data 740 from the party_1 database 705 and source data 755 from party_2 database 745 without exposing the underlying values of the source data 740 or 755 to either party. In some example embodiments, the party_2 database 745 shares available values data 720, which comprises schema data and metadata indicating which data (e.g., columns) of the source data 755 are allowed to be accessed when the stored procedure 725 runs in the background to perform the background JOINs to generate the query request table 735.

In some example embodiments, when the query request table 735 is shared with the party_2 database 745 (e.g., or upon a new entry being inserted into the query request table 735 that was previously shared), the stored procedure 765 runs on the side of party_2 database 745 to perform validation of the query. In some example embodiments, upon the query passing validation, the stored procedure 765 then inputs the query data into a request status table 715, which is then shared back with party_1 database 705. In some example embodiments, the request status table 715 is a table that tracks the requests and further comprises a function to create a table as a statement to create the results dataset 730 via further execution of the stored procedure 725 on the side of party_1 database 705 (e.g., execution of further code in the stored procedure 725 by execution nodes managed by the party_1 database 705). In some example embodiments, to generate the results dataset 730, the stored procedure 725 uses the available values data 720 (shared from party_2 database 745 to party_1 database 705) to only include those available values of the source data 755 that party_2 database 745 has specified. In some example embodiments, the request status table 715 is previously shared, and any time a new query is inserted into the request status table 715, the stored procedure 725 executes to complete the query and generate the results dataset 730 that comprises the requested data (e.g., overlap analysis).

Figure 8A:
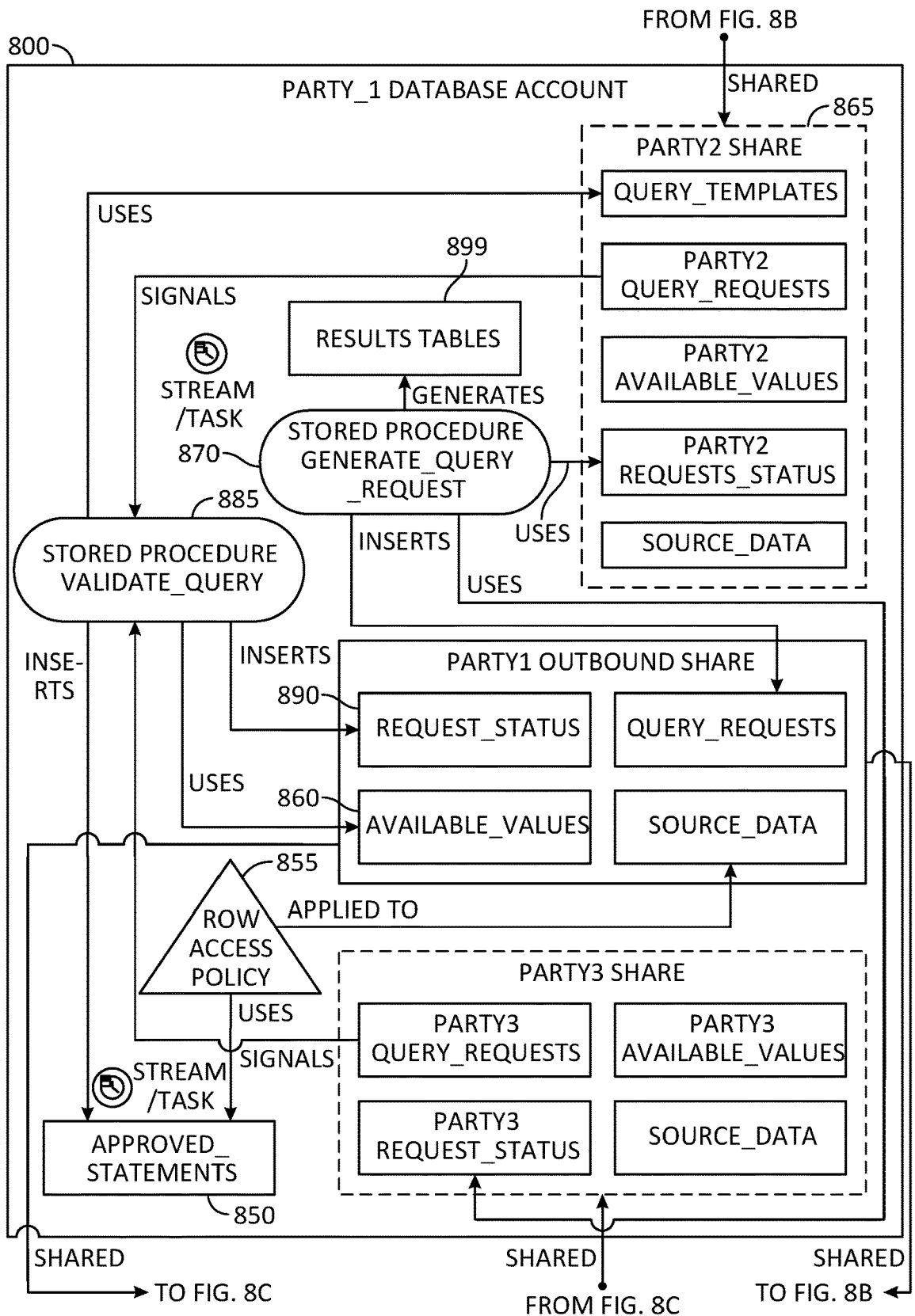
FIG. 8A shows a database account implementing a data clean room, according to some example embodiments.
Figure 8B:
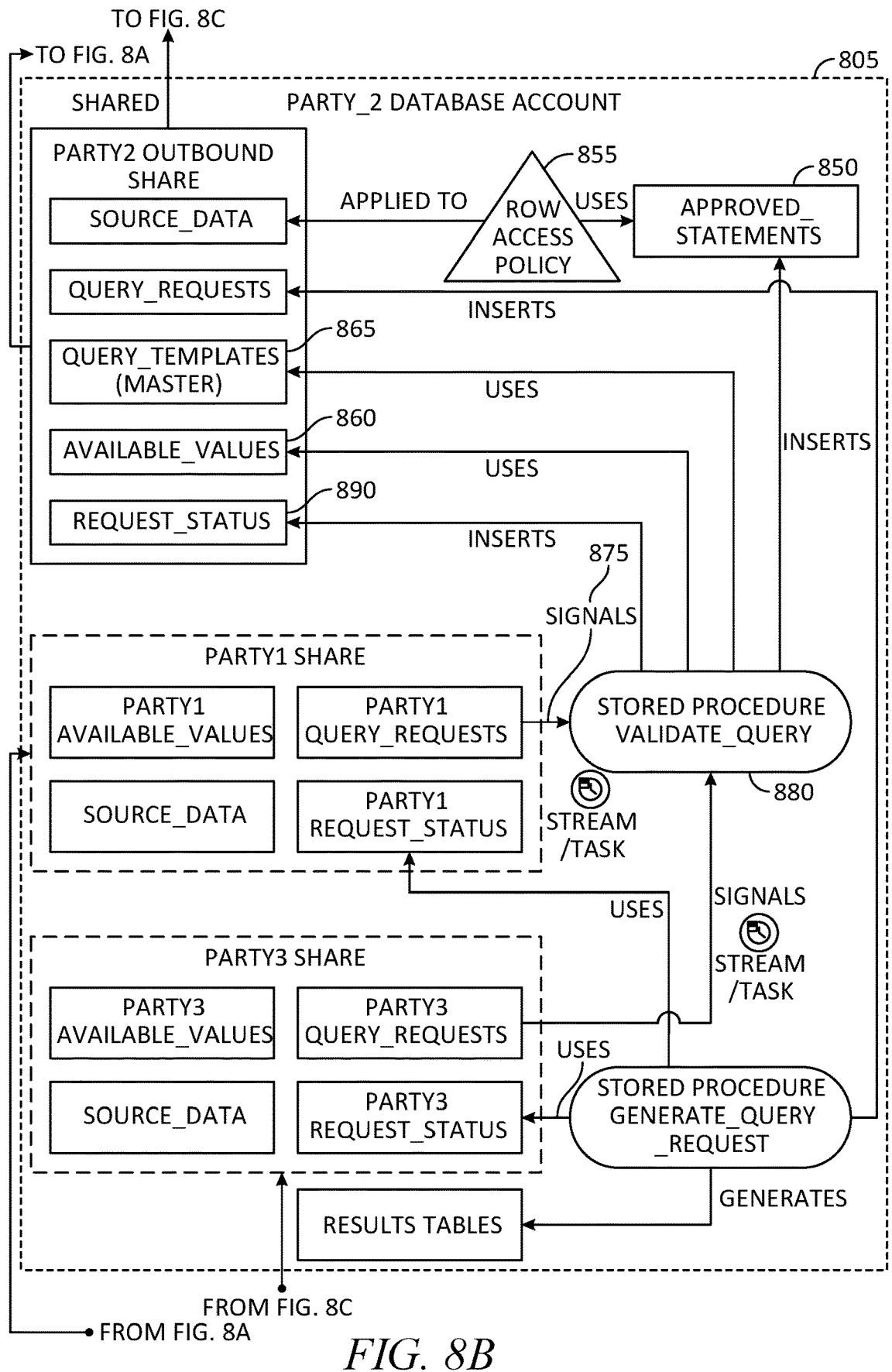
FIG. 8B shows a database account implementing a data clean room, according to some example embodiments.
Figure 8C:
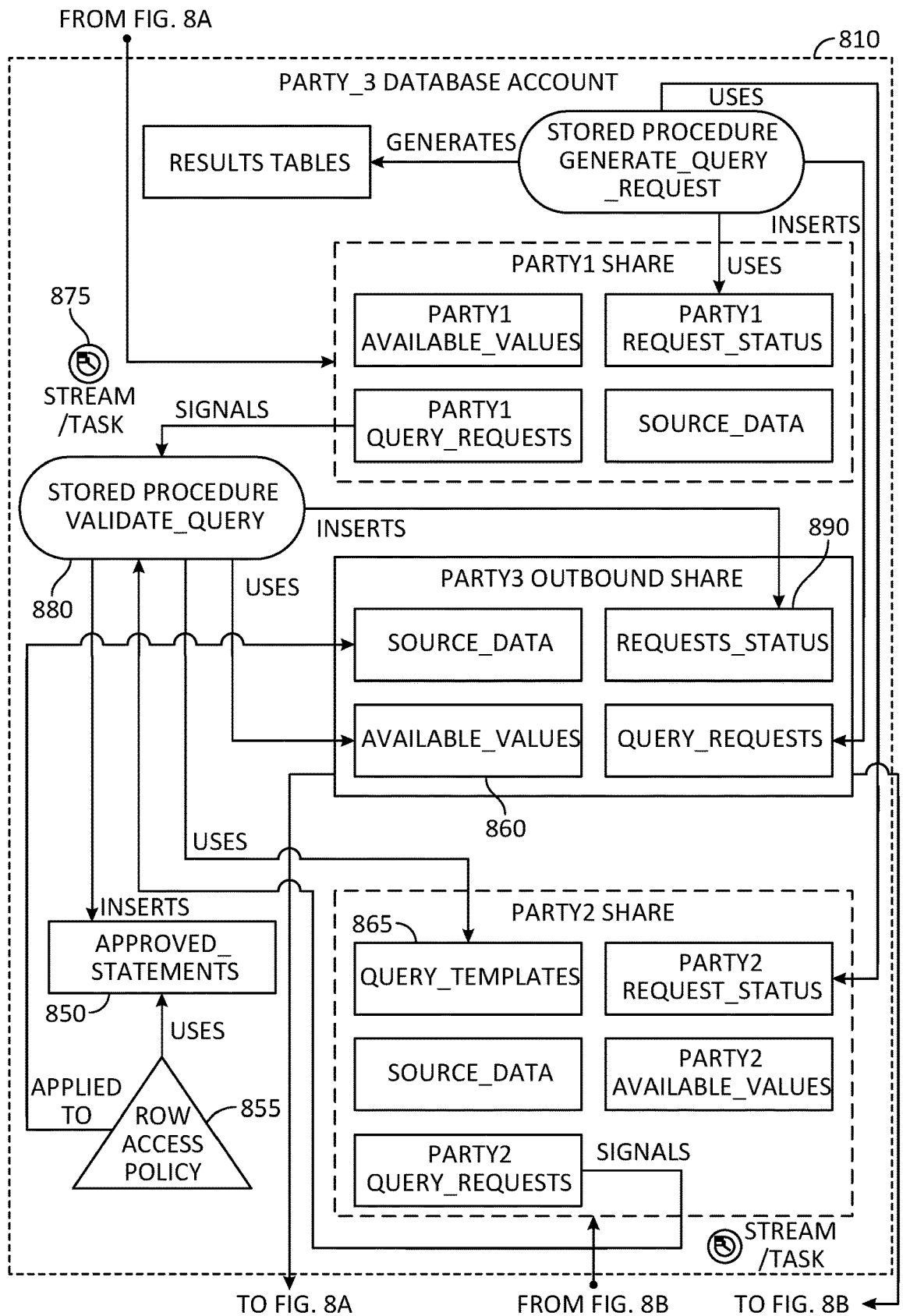
FIG. 8C shows a database account implementing a data clean room, according to some example embodiments.

FIG. 8A-C shows an example data clean room architecture for sharing data between multiple parties, according to some example embodiments. In the illustrated example, party_1 database account 800 is in FIG. 8A, party_2 database account 805 is in FIG. 8B, and party_3 database account 810 is in FIG. 8C, where data is transferred (e.g., replicated, shared) between the different accounts, as indicated by the broken labeled arrows that refer to other figures; for example, in FIG. 8B, a "Party2 Outbound Share" is shared from the party_2 database account 805 to the party_1 database account 800 in which the share is labeled as "Party2 Share" and connected by a broken arrow between FIG. 8A and FIG. 8B. The below data flows refer to operations that each party performs to share data with the other parties of FIGS. 8A-8C. For example, at operation 850, the party_1 database account 800 creates its APPROVED_STATEMENTS in its own database instance (e.g., illustrated in FIG. 8A); likewise at operation 850, party_2 database account 805 creates its APPROVED_STATEMENTS in its own database instance (e.g., illustrated in FIG. 8B), and further, party_3 database account 810 creates its APPROVED_STATEMENTS in its own database instance (e.g., illustrated in FIG. 8C).

At operation 850, each party creates an APPROVED_STATEMENTS table that will store the query request SQL statements that have been validated and approved. In some example embodiments, one of the parties creates the approved statements table, which is then stored by the other parties. In some example embodiments, each of the parties creates their own approved statements table, and a given query on the shared data must satisfy each of the approved statements table or otherwise the query cannot proceed (e.g., "SELECT *" must be in each respective party's approve statements table in order for a query that contains "SELECT *" to operate on data shared between the parties of the cleanroom).

At operation 855, each party creates a row access policy that will be applied to the source table(s) shared to each other party for clean room request processing. The row access policy will check the current statement( ) function against values stored in the APPROVED_STATEMENTS table.

Figure 9:
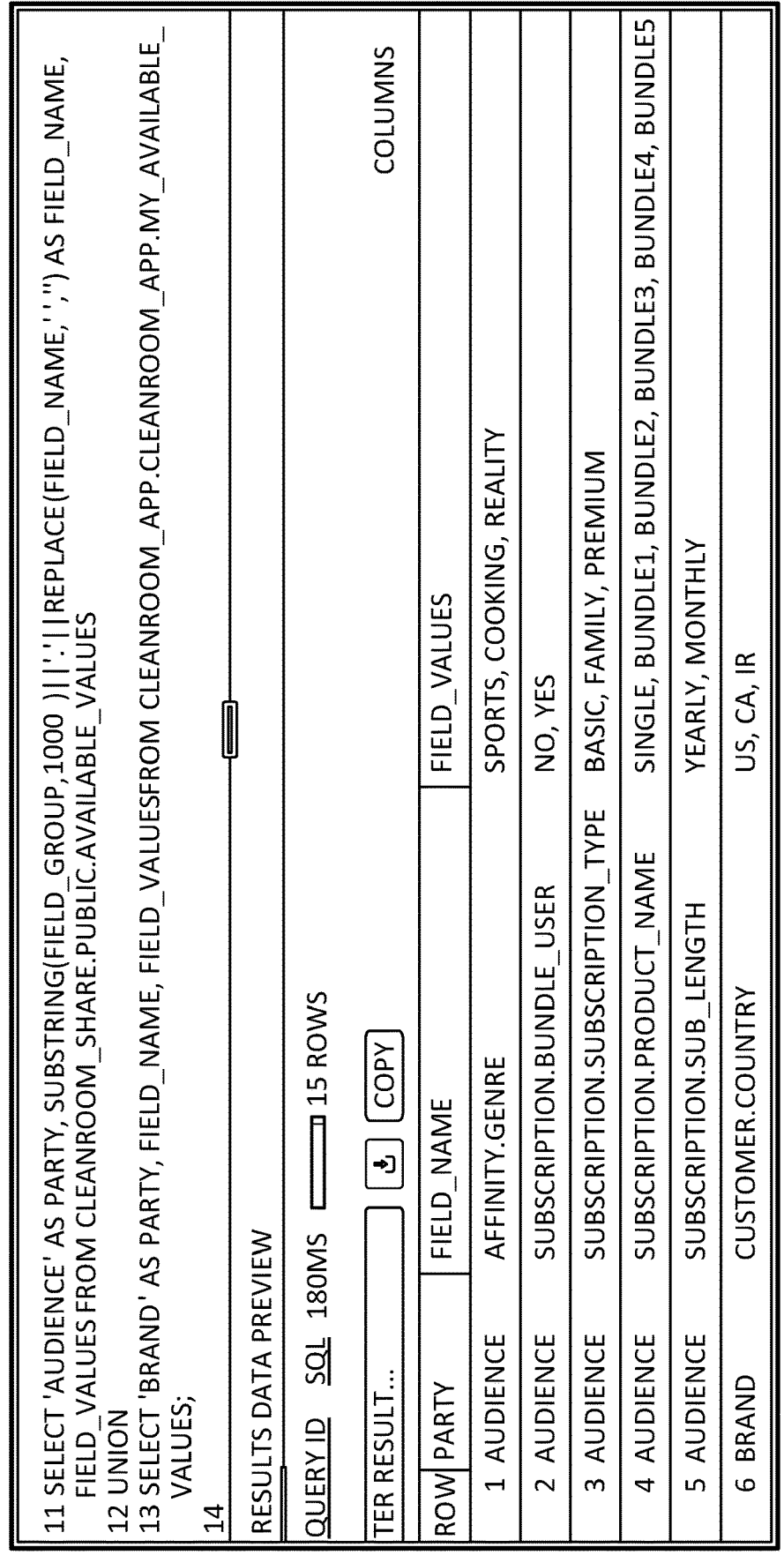
FIG. 9 shows an example of available values data, according to some example embodiments.

At operation 860, each party will generate their AVAILABLE_VALUES table, which acts as a data dictionary for other parties to understand which columns and values they can use in query requests. FIG. 9 shows an example of available values data 900 (e.g., schema, allowed columns, metadata specifying prohibited rows or cell values). As illustrated, the available values data 900 is not the actual data itself (e.g., source data) but rather specifies what data can be accessed (e.g., which columns of the source data) by the other parties (e.g., consumer accounts) for use in their respective shared data jobs (e.g., overlap analysis).

With reference back to FIG. 8C, at operation 865, each party agrees on one or more query templates that can be used for query requests. For example, if a media publisher and advertiser are working together in a clean room, they may approve an "audience overlap" query template. The query template would store join information and other static logic, while using placeholders for the variables (select fields, filters, etc.).

As an additional example, one of the parties is a Provider Account that specifies which statements are stored in the Available Statements table (e.g., thereby dictating how the providers data will be accessed by any consumer account wanting to access the Provider data. Further, in some example embodiments, the Provider Account further provides one or more query templates for use by any of the parties (e.g., consumer accounts) seeking to access the Provider's data according to the query template.

FIG. 10 shows an example of a query template 1000, according to some example embodiments. As illustrated, the query template 1000 comprises blanks or placeholders "{_____}" that can be replaced by specific fields via the consumer request (e.g., the specific fields can be columns from the consumer data, or columns from the provider data). Any change to the query template (e.g., adding an asterisk "*" to select all records) will be rejected by the data restrictions on the provider's data (e.g., the RAP functions as a firewall for the provider's data).

Continuing, at operation 870 (FIG. 8A), one of the party's (e.g., party_1 database account 800, in this example) will generate a clean room query request by calling the GENERATE_QUERY_REQUEST stored procedure. This procedure will insert the new request into the QUERY_REQUESTS table. This table is shared to each other party, along with the source data table(s) that have the row access policy enabled, the party's AVAILABLE_VALUES table, and the REQUEST_STATUS table.

At operation 875, each party has a stream object created against the other party's QUERY_REQUESTS table, capturing any inserts to that table. A task object will run on a set schedule and execute the VALIDATE_QUERY stored procedure if the stream object has data At operation 880, the VALIDATE_QUERY procedure is configured to: (1) Ensure the query request select and filter columns are valid attributes by comparing against the AVAILABLE_VALUES table. (2) Ensure the query template accepts the variables submitted. (3) Ensure the threshold or other query restrictions are applied. (4) If validation succeeds, the procedure generates a create table as select (CTAS) statement and stores it in the APPROVED_STATEMENTS table. (5) Updates the REQUEST_STATUS table with success or failure. If success, the CTAS statement is also added to the record.

At operation 885, the GENERATE_QUERY_REQUEST procedure will also call the VALIDATE_QUERY procedure on the requesting party's account. This is to ensure the query generated by each additional party and the requesting party matches, as an extra layer of validation.

At operation 890, the REQUEST_STATUS table, which is shared by each party, is updated with the status from the VALIDATE_QUERY procedure. The GENERATE_QUERY_REQUEST procedure will wait and poll each REQUEST_STATUS table until a status is returned.

At operation 899, once each party has returned a status, the GENERATE_QUERY_REQUEST procedure will compare all of the CTAS statements to ensure they match (if status is approved). If they all match, the procedure will execute the statement and generate the results table.

Figure 11:
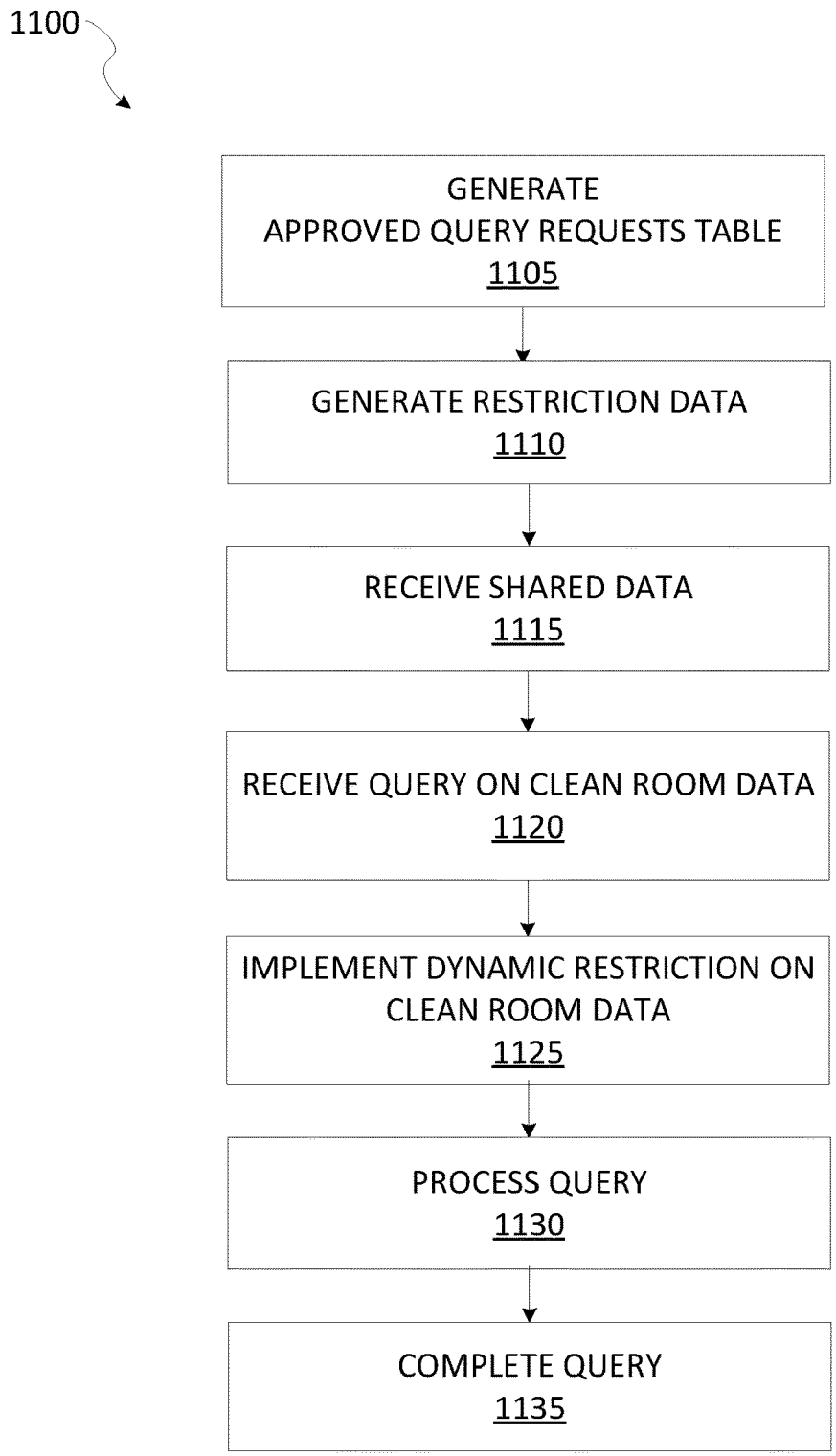
FIG. 11 shows a flow diagram of a method for implementing dynamically restricted data in a clean room between multiple parties, according to some example embodiments.

FIG. 11 shows a flow diagram of a method 1100 for implementing a dynamically restricted data clean room, according to some example embodiments. At operation 1105, the data clean room system 230 generates an approved statements table (e.g., approved statements table 410, approved statements table 760).

At operation 1110, the dynamic restriction engine 233 stores restriction data for dynamic restrictions on the source data. As an example, a row access policy engine policy is stored in the dynamic restriction engine 233 using the following database statements:

:::::CODE:::::
CREATE party2_rap AS (cust_id int, email varchar) returns boolean→current_role( ) IN ('ACCOUNTADMIN', 'PARTY2')//specifies role or exists (select statement from approved_statements where query_text=current_statement( ));
:::::CODE:::::

At operation 1115, the data clean room system 230 receives shared data. For example, the first database account receives source data 470 as a database share object, where the data included in the source data 470 is dynamically restricted according to the dynamic restriction engine 233 at query runtime. As an additional example, the data clean room system 230 executes the stored procedure 725 using the available values data 720 to generate a join of another database's data, such as the source data 755, where only the data specified by the available values data 720 (e.g., columns) are used to generate results.

At operation 1120, the data clean room system 230 receives a query (e.g., generated from a query template) on data clean room query. For example, the query specifies database statements to be applied to a join on source data 420 and shared source data 470. For example, the query received at operation 1120 can include:

::::::CODE:::::
SELECT COUNT(*)
FROM party1.customer c1 JOIN party2.customer c2
  ON c1.email=c2.email
::::::CODE:::::

At operation 1125, the dynamic restriction engine 233 implements restrictions on the shared data according to the restriction data generated at operation 1110. The restrictions can include row access policy engine or a dynamic data masking engine, or both. For example row-level data can be restricted using the row access policy engine, followed by column-level masking using the dynamic data masking engine. In accordance with some example embodiments, the dynamic restriction engine 233 implements a stored procedure (e.g., stored procedure 765) to validate query statements.

At operation 1130, the data clean room system 230 processes the query. For example, the query is executed on the first database account 405 against the source data 420 and the shared source data 470 as limited by the row access policy engine 460. As an additional example, an instance of the data clean room system 230 active on the side of party_1 database 705 detects an entry in the request status table 715, which causes stored procedure 725 to activate and process data from the different parties (e.g., overlap analysis).

At operation 1135, the data clean room system 230 completes query processing, such as returning the number of matching emails between the two database accounts (e.g., as results dataset 730).

Figure 12:
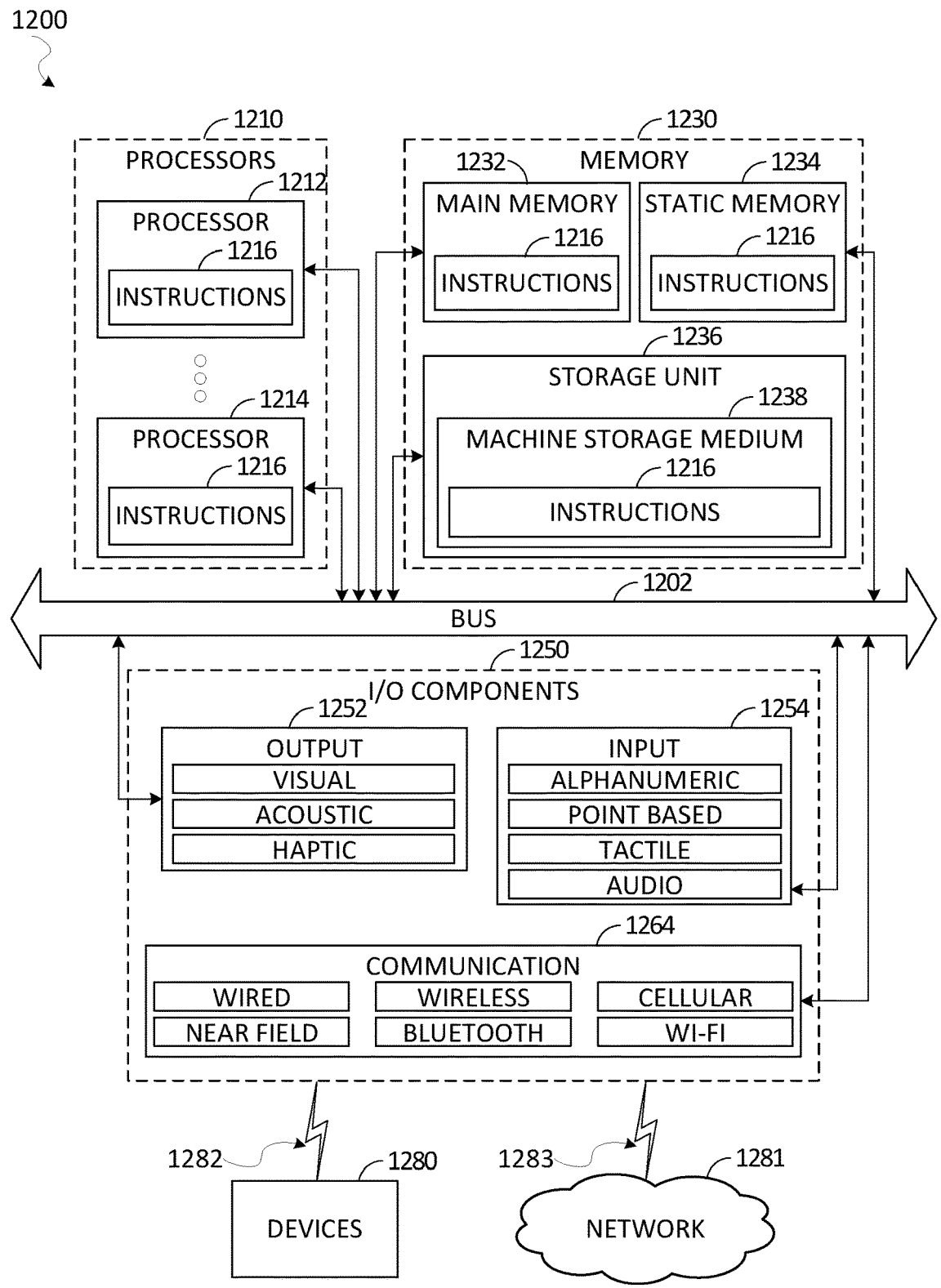
FIG. 12 illustrates a diagrammatic representation of a machine in the form of a computer system within which a set of instructions may be executed for causing the machine to perform any one or more of the methodologies discussed herein, in accordance with some embodiments of the present disclosure.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute any one or more operations of any one or more of the methods described herein. As another example, the instructions 1216 may cause the machine 1200 to implemente portions of the data flows described herein. In this way, the instructions 1216 transform a general, non-programmed machine into a particular machine 1200 (e.g., the client device 114, the compute service manager 108, the execution platform 110) that is specially configured to carry out any one of the described and illustrated functions in the manner described herein.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 includes processors 1210, memory 1230, and input/output (I/O) components 1250 configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 comprising a machine storage medium 1238 may store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1250 may include communication components 1264 operable to couple the machine 1200 to a network 1281 via a coupler coupling or to devices 1280 via a coupling 1282. For example, the communication components 1264 may include a network interface component or another suitable device to interface with the network 1281. In further examples, the communication components 1264 may include wired communication components, wireless communication components, cellular communication components, and other communication components to provide communication via other modalities. The devices 1280 may be another machine or any of a wide variety of peripheral devices (e.g., a peripheral device coupled via a universal serial bus (USB)). For example, as noted above, the machine 1200 may correspond to any one of the client device 114, the compute service manager 108, the execution platform 110, and may include any other of these systems and devices.

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1281 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1281 or a portion of the network 1281 may include a wireless or cellular network, and the coupling 1283 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1281 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1282 (e.g., a peer-to-peer coupling) to the devices 1280. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: accessing, from a first database of a distributed database, a first shared source dataset from a second database of the distributed database and a second shared source dataset from a third database of the distributed database; storing an approved statements table comprising database statements that are executable via the distributed database against the first shared source dataset, the second shared source dataset, and a source dataset, the source dataset being managed on the distributed database by the first database; determining that one or more elements in the database statements are in the approved statements table; in response to the one or more elements of the database statements being in the approved statements table, generating a results dataset by executing the database statements against the first shared source dataset, the second shared source dataset, and the source dataset; and storing, by one or more processors of a machine, the results dataset in the first database.

Example 2. The method of example 1, wherein the database statements in the approved statements table comprise a query request from the first database.

Example 3. The method of any of examples 1 or 2, wherein the query request is validated by a first validation database execution object on the second database.

Example 4. The method of any of examples 1-3, wherein the query request is validated by a second validation database execution object on the third database.

Example 5. The method of any of examples 1-4, wherein the first validation database execution object and the second validation database execution object are stored procedures of the distributed database.

Example 6. The method of any of examples 1-5, wherein the first validation database execution object and the second validation database execution object are user-defined functions (UDFs) of the distributed database.

Example 7. The method of any of examples 1-6, further comprising: receiving, from the second database, a query template comprising query language for execution in accordance with the first validation database execution object.

Example 8. The method of any of examples 1-7, wherein the query request that is generated by the first database is a modified version of the query template that is received from the second database.

Example 9. The method of any of examples 1-8, wherein the results dataset is generated by a stored procedure that is executed on the first database using an available values data that is received from the second database, the available values data comprising a schema of allowed columns of the second shared source dataset that are useable by the stored procedure to generate the results dataset.

Example 10. The method of any of examples 1-9, wherein the query request is against a combination of portions of the first shared source dataset, the second shared source dataset, and the source dataset.

Example 11. The method of any of examples 1-10, wherein the query request comprises a join database statement to join matching entries in one or more of: the first shared source dataset, the second shared source dataset, and the source dataset.

Example 12. A system comprising: one or more processors of a machine; and at least one memory storing instructions that, when executed by the one or more processors, cause the machine to perform operations implementing any of examples 1-11.

Example 13. A machine-readable storage device embodying instructions that, when executed by a machine, cause the machine to perform operations implementing any of examples 1-11.

What is claimed is:

1. A method comprising:
   accessing, from a first database of a distributed database, a first shared source dataset from a second database of the distributed database and a second shared source dataset from a third database of the distributed database;
   storing an approved statements table comprising database statements that are executable via the distributed database against the first shared source dataset, the second shared source dataset, and a source dataset, the source dataset being managed on the distributed database by the first database;
   determining that one or more elements in the database statements are in the approved statements table;
   in response to the one or more elements of the database statements being in the approved statements table, generating a results dataset by executing the database statements against the first shared source dataset, the second shared source dataset, and the source dataset; and
   storing, by one or more processors of a machine, the results dataset in the first database.

2. The method of claim 1, wherein the database statements in the approved statements table comprise a query request from the first database.

3. The method of claim 2, wherein the query request is validated by a first validation database execution object on the second database.

4. The method of claim 2, wherein the query request is validated by a second validation database execution object on the third database.

5. The method of claim 4, wherein the first validation database execution object and the second validation database execution object comprise stored procedures of the distributed database.

6. The method of claim 4, wherein the first validation database execution object and the second validation database execution object comprise user-defined functions (UDFs) of the distributed database.

7. The method of claim 3, further comprising:
receiving, from the second database, a query template comprising query language for execution in accordance with the first validation database execution object.

8. The method of claim 7, wherein the query request that is generated by the first database comprises a modified version of the query template that is received from the second database.

9. The method of claim 1, wherein the results dataset is generated by a stored procedure that is executed on the first database using an available values data that is received from the second database, the available values data comprising a schema of allowed columns of the second shared source dataset that are useable by the stored procedure to generate the results dataset.

10. The method of claim 2, wherein the query request is against a combination of portions of the first shared source dataset, the second shared source dataset, and the source dataset.

11. The method of claim 10, wherein the query request comprises a join database statement to join matching entries in one or more of: the first shared source dataset, the second shared source dataset, and the source dataset.

12. A system comprising:
one or more processors of a machine; and
at least one memory storing instructions that, when executed by the one or more processors, cause the machine to perform operations comprising:
accessing, from a first database of a distributed database, a first shared source dataset from a second database of the distributed database and a second shared source dataset from a third database of the distributed database;
storing an approved statements table comprising database statements that are executable via the distributed database against the first shared source dataset, the second shared source dataset, and a source dataset, the source dataset being managed on the distributed database by the first database;
determining that one or more elements in the database statements are in the approved statements table;
in response to the one or more elements of the database statements being in the approved statements table, generating a results dataset by executing the database statements against the first shared source dataset, the second shared source dataset, and the source dataset; and
storing the results dataset in the first database.

13. The system of claim 12, wherein the database statements in the approved statements table comprise a query request from the first database.

14. The system of claim 13, wherein the query request is validated by a first validation database execution object on the second database.

15. The system of claim 14, wherein the query request is validated by a second validation database execution object on the third database.

16. The system of claim 15, wherein the first validation database execution object and the second validation database execution object comprise stored procedures of the distributed database.

17. The system of claim 15, wherein the first validation database execution object and the second validation database execution object comprise user-defined functions (UDFs) of the distributed database.

18. The system of claim 14, further comprising:
receiving, from the second database, a query template comprising query language for execution in accordance with the first validation database execution object.

19. The system of claim 18, wherein the query request that is generated by the first database is a modified version of the query template that is received from the second database.

20. One or more machine-storage media containing instructions that, when executed by a machine, cause the machine to perform operations comprising:
accessing, from a first database of a distributed database, a first shared source dataset from a second database of the distributed database and a second shared source dataset from a third database of the distributed database;
storing an approved statements table comprising database statements that are executable via the distributed database against the first shared source dataset, the second shared source dataset, and a source dataset, the source dataset being managed on the distributed database by the first database;
determining that one or more elements in the database statements are in the approved statements table;
in response to the one or more elements of the database statements being in the approved statements table, generating a results dataset by executing the database statements against the first shared source dataset, the second shared source dataset, and the source dataset; and
storing the results dataset in the first database.

21. The one or more machine-storage media of claim 20, wherein the database statements in the approved statements table comprise a query request from the first database.

22. The one or more machine-storage media of claim 21, wherein the query request is validated by a first validation database execution object on the second database.

23. The one or more machine-storage media of claim 21, wherein the query request is validated by a second validation database execution object on the third database.

24. The one or more machine-storage media of claim 23, wherein the first validation database execution object and the second validation database execution object comprise stored procedures of the distributed database.

25. The one or more machine-storage media of claim 23, wherein the first validation database execution object and the second validation database execution object comprise user-defined functions (UDFs) of the distributed database.

26. The one or more machine-storage media of claim 22, the operations further comprising:
receiving, from the second database, a query template comprising query language for execution in accordance with the first validation database execution object.

27. The one or more machine-storage media of claim 26, wherein the query request that is generated by the first database comprises a modified version of the query template that is received from the second database.

28. The one or more machine-storage media of claim 20, wherein the results dataset is generated by a stored procedure that is executed on the first database using an available values data that is received from the second database, the available values data comprising a schema of allowed columns of the second shared source dataset that are useable by the stored procedure to generate the results dataset.

29. The one or more machine-storage media of claim 21, wherein the query request is against a combination of portions of the first shared source dataset, the second shared source dataset, and the source dataset.

30. The one or more machine-storage media of claim 29, wherein the query request comprises a join database statement to join matching entries in one or more of: the first shared source dataset, the second shared source dataset, and the source dataset.

\* \* \* \* \*